US011938989B2

(12) United States Patent
Sherman et al.

(10) Patent No.: US 11,938,989 B2
(45) Date of Patent: Mar. 26, 2024

(54) METHODS OF USING SHOPPING CART

(71) Applicant: ZIBRA, LLC, Mooresville, NC (US)

(72) Inventors: Michael Milton Sherman, Mooresville, NC (US); William Lane Ball, Statesville, NC (US)

(73) Assignee: ZIBRA, LLC, Mooresville, NC (US)

( * ) Notice: Subject to any disclaimer, the term of this patent is extended or adjusted under 35 U.S.C. 154(b) by 0 days.

(21) Appl. No.: 18/203,037

(22) Filed: May 29, 2023

(65) Prior Publication Data

US 2023/0347959 A1 Nov. 2, 2023

Related U.S. Application Data

(63) Continuation of application No. 17/700,449, filed on Mar. 21, 2022, now Pat. No. 11,661,095, which is a continuation of application No. 16/742,421, filed on Jan. 14, 2020, now Pat. No. 11,279,389.

(60) Provisional application No. 62/792,328, filed on Jan. 14, 2019.

(51) Int. Cl.
*B62B 3/14* (2006.01)
*B62B 3/02* (2006.01)

(52) U.S. Cl.
CPC .............. *B62B 3/1444* (2013.01); *B62B 3/02* (2013.01); *B62B 3/1452* (2013.01); *B62B 3/1472* (2013.01)

(58) Field of Classification Search
CPC ...... B62B 3/144; B62B 3/1444; B62B 3/1452
See application file for complete search history.

(56) References Cited

U.S. PATENT DOCUMENTS

| | | | | | |
|---|---|---|---|---|---|
| 4,116,456 | A | * | 9/1978 | Stover | B62B 3/182 280/33.993 |
| 5,435,582 | A | * | 7/1995 | Davidson | B62B 3/1468 280/47.35 |
| 5,439,253 | A | * | 8/1995 | Trubiano | A47D 15/006 280/33.993 |
| 5,651,557 | A | * | 7/1997 | De Stefano | B62B 3/144 280/33.993 |
| 5,702,114 | A | * | 12/1997 | Downing | B62B 3/144 280/47.23 |
| 5,897,165 | A | * | 4/1999 | Kucharczyk | B62B 3/144 297/219.12 |
| 5,918,891 | A | * | 7/1999 | Russell | B62B 3/144 280/33.993 |
| 5,988,744 | A | * | 11/1999 | Franchak | A47D 15/006 297/219.12 |

(Continued)

*Primary Examiner* — Jeffrey J Restifo
(74) *Attorney, Agent, or Firm* — TILLMAN WRIGHT, PLLC; Chad D. Tillman

(57) ABSTRACT

A child seat includes a base and a seatback movable relative thereto between a retracted position, in which the seatback preferably is flush with a top of the base, and an extended position, in which a sitting area of the child seat is exposed for sitting and in which the seatback serves to support a child's back. The seatback of the child seat preferably includes a seat belt for restraint of a child when seated in the sitting area. A shopping cart includes the child seat. The seatback includes a gate movable between a retracted position, in which the gate preferably is flush with the seatback, and an extended position, in which the gate extends in a generally upright manner and partially blocks leg openings of the basket to keep items from falling there through when the seatback is in the retracted position.

20 Claims, 19 Drawing Sheets

(56) References Cited

U.S. PATENT DOCUMENTS

| | | | | |
|---|---|---|---|---|
| 6,098,999 | A * | 8/2000 | Anastasia | B60B 33/023 280/33.994 |
| 6,126,181 | A * | 10/2000 | Ondrasik | B62B 3/1468 280/47.35 |
| 6,186,521 | B1 * | 2/2001 | Divoky | B62B 3/144 280/33.993 |
| 6,206,471 | B1 * | 3/2001 | McGowan | B62B 5/06 297/219.12 |
| 6,644,674 | B2 * | 11/2003 | Simard | B62B 3/1468 280/47.35 |
| 7,063,337 | B2 * | 6/2006 | Russell | B62B 3/144 280/DIG. 3 |
| 7,168,711 | B2 * | 1/2007 | Ondrasik | B62B 3/1404 280/DIG. 4 |
| 7,182,349 | B2 * | 2/2007 | Prather | B62B 3/1468 280/DIG. 4 |
| 7,237,782 | B2 * | 7/2007 | Tucker | B62B 3/144 280/33.991 |
| 7,322,582 | B2 * | 1/2008 | Prather | B62B 3/144 280/DIG. 4 |
| 7,396,025 | B2 * | 7/2008 | Ondrasik | B62B 3/144 280/DIG. 4 |
| 7,416,194 | B2 * | 8/2008 | Splain | B62B 3/1496 280/33.997 |
| 7,681,891 | B2 * | 3/2010 | Deal | B62B 3/1472 280/33.997 |
| 7,766,347 | B2 * | 8/2010 | Ryan | B62B 3/144 280/30 |
| 8,002,290 | B2 * | 8/2011 | Russell | B62B 3/144 280/33.993 |
| D644,809 | S * | 9/2011 | Walter | D34/21 |
| D645,222 | S * | 9/2011 | Walter | D34/21 |
| 8,152,236 | B1 * | 4/2012 | Romero | A47D 1/10 297/230.11 |
| D692,201 | S * | 10/2013 | Walter | D34/27 |
| 8,991,836 | B2 * | 3/2015 | Walter | B62B 3/144 280/33.993 |
| D749,286 | S * | 2/2016 | Sherman | D34/27 |
| 9,598,097 | B2 * | 3/2017 | Sherman | B62B 3/146 |
| 10,518,795 | B1 * | 12/2019 | Eisele | B62B 3/1452 |
| 10,575,658 | B2 * | 3/2020 | Romero | A47D 1/10 |
| D914,317 | S * | 3/2021 | Ebling | D34/21 |
| D914,318 | S * | 3/2021 | Ebling | D34/21 |
| 11,661,095 | B2 * | 5/2023 | Sherman | B62B 3/144 280/33.993 |
| 2009/0026820 | A1 * | 1/2009 | Dunblazier | B62B 3/1452 297/256.17 |
| 2010/0018094 | A1 * | 1/2010 | Giampavolo | B62B 3/1408 40/606.03 |
| 2014/0191547 | A1 * | 7/2014 | Fink | B62B 3/1444 297/256.17 |
| 2020/0223466 | A1 * | 7/2020 | Sherman | B62B 3/1444 |
| 2021/0261182 | A1 * | 8/2021 | Eisele | B62B 3/1452 |
| 2022/0212704 | A1 * | 7/2022 | Sherman | B62B 3/1444 |

\* cited by examiner

METHODS OF USING SHOPPING CART

CROSS-REFERENCE TO RELATED APPLICATION

The present application claims priority back to U.S. provisional patent application 62/792,328, filed Jan. 14, 2019, which provisional patent application is incorporated by reference herein. The disclosure of the '328 application is set forth in the appendix attached hereto, which also is incorporated herein by reference.

COPYRIGHT STATEMENT

Any new and original work of authorship in this document is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The present invention generally relates to shopping carts and, in particular, shopping carts having child seats. Shopping carts are known each of which is designed to accommodate one or more children to be seated and pushed around therein. For example, U.S. Design Pat. Nos. D749,286; D786,524; D790,146; D790,147; D800,408; D802,867; D802,868; D802,869; and D802,879 each discloses a shopping cart. Additionally, U.S. Pat. Nos. 9,598,097 and 9,944,304 each discloses a shopping cart that is capable of seating an infant and a toddler for pushing around in the shopping cart. Each of these design and utility patents is incorporated herein by reference.

While suitable for their intended purposes, such shopping carts are believed to be subject to improvement. It is believed that a cart in accordance with at least one or more of the aspects and features of the present invention represents such an improvement. Specifically, a preferred shopping cart of the invention is believed to provide for, inter alia, the safe and comfortable restraint of a sitting child as well as better utilization of the cart space for carrying items when not sitting a child.

SUMMARY OF THE INVENTION

The present invention includes many aspects and features. Moreover, while many aspects and features relate to, and are described in, the context of shopping and shopping carts, the present invention is not limited to use only in shopping and shopping carts, as will become apparent from the following summaries and detailed descriptions of aspects, features, and one or more embodiments of the present invention.

Accordingly, in an aspect of the invention, a child seat for use in a cart comprises a base and a seatback connected to the base and movable relative thereto between a retracted position, in which the seatback is received within the base, and an extended position, in which a sitting area of the child seat is exposed for sitting and in which the seatback serves to support a back of a child when sitting in the sitting area.

In a feature, the seatback is flush with a top of the base when in the retracted position.

In a feature, the seatback rotates between the retracted position and the extended position.

In a feature, the base defines the sitting area.

In a feature, the seatback is received within the sitting area and covers a floor of the sitting area when in the retracted position.

In a feature, the seatback comprises a gate connected to the seatback and movable relative thereto between a retracted position, in which the gate is received within the seatback and is flush with a surface of the seatback, and an extended position, in which the gate extends in a generally upright manner from the surface of the seatback In a feature, the gate is flush with the seatback when the gate is in the retracted position.

In a feature, the gate is flush with a surface of the seatback when the gate is in the retracted position, the surface of the seatback with which the gate is flush being an outwardly facing surface of the seatback when the seatback is in the retracted position.

In a feature, the gate rotates between the retracted position and the extended position, the gate being received within a recessed area defined by the seatback when the gate is in the retracted position.

In a feature, the seatback rotates about a first axis in moving between the retracted position of the seatback and the extended position of the seatback.

In a feature, the gate rotates about a second axis in moving between the retracted position of the gate and the extended position of the gate.

In a feature, the first axis and the second axis are parallel and are located on opposite widthwise sides of the seatback.

In a feature, the seatback and the gate rotate in opposite rotational directions when moving from their respective retracted positions to their respective extended positions.

The seatback preferably comprises a seatbelt for restraint of a child when seated in the sitting area. In particular, the seatback preferably comprises a recess within which a seatbelt module is received, the seatbelt module comprising the seatbelt for restraint of a child when seated in the sitting area, and the recess is located in a surface of the seatback that faces the sitting area when the seatback is in the retracted position.

The seatbelt module preferably is flush with the seatback when received within the recess.

Another aspect of the invention includes a cart comprising a child seat disclosed herein, and the cart preferably is a shopping cart.

In another aspect of the invention, a method of using a cart disclosed herein comprises, when using the cart to seat a child, moving the gate to its retracted position, moving the seatback to its extended position, siting a child in the sitting area such that legs of the child extend through leg openings in the cart and a back of the child rests against the seatback in its extended position, and restraining the child with the seatbelt; and when using the cart to contain items and not seat a child, moving the seatback to its retracted position and moving the gate to its extended position to inhibit items contained in the cart from falling through the leg openings in the cart.

In another aspect, and as will be appreciated from the detailed description set forth below, a preferred cart is similar to the carts of the incorporated design and utility patents and includes a chassis; wheels attached to the chassis; an upper basket attached to the chassis and defining an upper cargo area for receiving articles for transport on the cart; and, a lower basket attached to the chassis and defining a lower cargo area for receiving articles for transport on the cart.

Unlike the carts of the incorporated design and utility patents, and in accordance with this aspect, the upper basket comprises a child seat and, preferably, the bottom of the upper basket defines a recess or opening within which the child seat is received. In this respect, the child seat preferably includes a base with one or more peripheral rims that overlap edges of the bottom of the upper basket for insertion and retention of the child seat within the recess or opening.

The child seat further preferably comprises a seatback that is transitionable from a retracted or closed position to an extended or upright position. Moreover, the top of the child seat preferably is generally flush with the bottom of the upper basket when the seatback is in the retracted or closed position. This enables increased utilization of the upper basket for holding items when a child is not seated in the cart.

Preferably, the seatback comprises a gate that is transitionable from a retracted or closed position to an extended or upright position and that is moved to the extended or open position in order to keep items placed in the upper basket from falling through leg openings in the rear wall of the upper basket when the seatback is in the retracted or closed position for maximum utilization of the upper basket for holding items.

In a feature of this aspect, the child seat is located over and supported by a widthwise support member of the chassis. In some embodiments, such widthwise support member is the only part of the chassis that extends the width of the cart underneath and in engagement with the upper basket and that is directly connected to and directly supports the upper basket in its cantilevered position over the lower basket.

In a feature of this aspect, the cart comprises a shopping cart.

In a feature of this aspect, the cart is made from one or more plastics.

In a feature of this aspect, the cart is made from one or more wires, rods, and tubes.

In a feature of this aspect, one or both of the baskets each comprises a wire basket.

In a feature of this aspect, one or both of the baskets each comprises a wire grid defining a bottom of the basket. The wire grid may be made from a plastic or metal material, and preferably, the metal material has a coated, painted, or molded outer layer.

In a feature of this aspect, both baskets each comprises a wire grid defining a bottom of the basket.

In a feature of this aspect, the upper basket is cantilevered over the lower basket.

In a feature of this aspect, the cart further comprises a rack located under the lower basket. The rack preferably comprises a wire framework that is bounded at the front and sides by the chassis, including a portion of the chassis that defines a U-shaped bottom bumper of the cart that extends around the front and part of the sides of the bottom of the cart. In an additional related feature, the lower basket is cantilevered over the rack, and the chassis comprises a widthwise support member on which the lower basket is supported in its cantilevered position over the rack. In some embodiments, such widthwise support member is the only part of the chassis that extends the width of the cart underneath and in engagement with the lower basket and that is directly connected to and directly supports the lower basket in its cantilevered position over the rack.

In a feature of this aspect, the wheels include a pair of front wheels and a pair of back wheels. In an additional related feature, each wheel of the two pair of wheels swivel 360 degrees. In an alternative additional related feature, each of the pair of front wheels swivel 360 degrees, and neither of the pair of back wheels swivels.

In a feature of this aspect, the cart is designed and configured to nest with other like carts. In an additional related feature, the nesting is accomplished by pushing the front of a first one of the carts into the rear of a second one of the carts such that the upper basket of the first cart is received within the upper basket of the second cart, and the lower basket of the first cart is received within the lower basket of the second cart. When nesting, a rear wall of the upper basket of the second cart preferably rotates upwardly in response to the front of the upper basket of the first cart being pushed there against, and a rear wall of the lower basket of the second cart preferably collapses by rotating downwardly in response to the front of the lower basket of the first cart being pushed there against.

In a feature of this aspect, the cart comprises one or more cup holders. In an additional related feature, a cup holder is attached to the chassis of the cart at a forward inside corner of the upper basket of the cart.

In a feature of this aspect, the cart comprises one or more mobile phone holders. In an additional related feature, a mobile phone holder is attached to the chassis of the cart at a forward inside corner of the upper basket of the cart.

In a feature of this aspect, the cart includes no widthwise push bar in a rear of the cart for pushing of the cart by a person such that access is unobstructed to the upper basket and to the lower basket from the rear of the cart by a person.

In a feature of this aspect, the chassis comprises elongate members connected together, such as, for example, by welding or by being integrally connected through molding or other formation technique. The elongate members may comprise, for example, tubes having oval, rectangular, triangular, or other polygonal cross-sectional profiles, as well as combinations thereof. Still yet, in some embodiments the chassis consists of such elongate members connected together. The elongate members further may be bent.

In another aspect of the invention, and as will be appreciated from the detailed description set forth below, a preferred cart is similar to the carts of the incorporated design and utility patents and includes a chassis; wheels attached to the chassis; an upper basket attached to the chassis and defining an upper cargo area for receiving articles for transport on the cart; and, a lower basket attached to the chassis and defining a lower cargo area for receiving articles for transport on the cart.

Unlike the carts of the incorporated design and utility patents, and in accordance with this aspect, the chassis defines on each of the opposite lateral sides of the cart a pair of vertically spaced members that each surrounds and defines—by bounding—an interior area that is open. At least the upper member of each pair of vertically spaced members serves as a handle for pushing of the cart. Each member of each pair of vertically shaped members comprise an elongate member shaped in an oval or other bounded geometric shape and having a sufficient widthwise dimension for gripping by a hand for use as a handle bar in maneuvering the cart. The interior opening area can be used for promotional space. Each pair of vertically spaced members on each side of the cart are referred to herein as "handles", although it may be that, as a practical matter, only the upper members of these vertically spaced pairs are used as handles by a person for pushing the cart when shopping.

Each upper handle on each side of the cart is directly connected to and extends from a top of the upper basket downwardly to beyond a bottom of the floor of the upper basket and to at least an elevation of a widthwise member that extends the width of the upper basket. Indeed, this widthwise member preferably is connected to and extends between respective lower portions of the upper handles. Additionally, each upper handle preferably does not extend to an elevation of the lower basket and, in fact, stops short of any portion of the lower basket such that a respective spacing is defined between each upper handle and the lower basket. Similarly, each lower handle on each side of the cart is directly connected to and extends from the bottom of the chassis (e.g., from adjacent the rack) upwardly to an intermediate elevation of the lower basket and stops short of extending to and being connected to a top of the lower basket, such that a respective spacing is defined between the top of the lower basket and the uppermost part of the lower handle.

In a feature, one or more elongate members of the chassis on each side of the cart extend between and connect the handles. In some embodiments including such features, the handles and an elongate member connecting the handles on a lateral side of the cart define the shape of armless spectacles. In some embodiments including such features, such elongate member is curved and in the shape of an arc in extending between the handles, with such elongate member extending beyond the rear of the upper basket and the rear of the lower basket so as to define the rearmost part of the cart. Furthermore, in some embodiments including such features, the handles on each side are vertically located over a wheel of the cart.

In a feature of this aspect, the rear area of the upper basket preferably comprises a seat for a child and, preferably, an infant.

In a feature of this aspect, the lower basket defines a seat at a rear area thereof for a toddler. In an additional related feature, a rear wall of the lower basket moves away so that the rear area including a resulting rear edge of the lower basket is used as a ledge for sitting of the toddler. Additionally, the rear of the upper basket is horizontally offset toward the front of the cart relative to the rear of the lower basket so as to provide clearance by which a toddler sits up when seated on the rear ledge of the lower basket.

In another aspect, a shopping cart comprises a child seat that comprises a seatback that is movable between an extended position and a retracted position, wherein the child seat is located in a floor of the upper basket. Preferably a seatback of the child seat is transitionable to a retracted position such that the top of the child seat is flush with the floor of the upper basket when the child seat is not used with a child.

In a feature of this aspect, the shopping cart is nestable with another similar shopping cart, and the nesting can be performed whether the child seat of each cart is in the extended position or the retracted position.

In another aspect, a shopping cart comprises a basket and a child seat located in a floor of the basket.

In a feature, the child seat comprises a seatback that is movable between an extended position for use with a child and a retracted position in which a top of the child seat is flush with the floor of the upper basket when the child seat is not used with a child. In a related feature, the shopping cart is nestable with another similar shopping cart, and wherein the nesting can be performed whether the child seat of each cart is in the extended position of the retracted position.

In a feature, the child seat comprises a gate that is movable between an extended position and a retracted position.

In a feature, the child seat comprises a seatback that is movable between an extended position for use with a child and a retracted position in which a top of the child seat is flush with the floor of the upper basket when the child seat is not used with a child, and the child seat comprises a gate that is movable between an extended position and a retracted position. Preferably, a top of the child seat is generally flush with a bottom of the floor of the basket when the seatback and the gate are in their retracted positions.

In a feature, the child seat comprises a housing configured for insertion within a recess or opening in a rear area of the basket of the cart and, when so received in the recess or opening, a top of the child seat is generally flush with a bottom of the floor of the basket.

In another aspect, a child seat for use in a cart comprises a base and a seatback connected to the base and movable relative thereto between a retracted position, in which the seatback is flush with a top of the base, and an extended position, in which a sitting area of the child seat is exposed for sitting and in which the seatback serves to support a back of a child when sitting in the sitting area.

In a feature, the seatback comprises a gate connected to the seatback and movable relative thereto between a retracted position, in which the gate is flush with a surface of the seatback, and an extended position, in which the gate extends in a generally upright manner from a surface of the seatback.

Yet another aspect comprises making a cart in accordance with one or more of the foregoing aspects and features; and another aspect comprises using a cart in accordance with one or more of the foregoing aspects and features.

Yet another aspect comprises a child seat as disclosed above; another aspect comprise making such a child seat; and another aspect comprises using such a child seat in conjunction with a cart.

Additional aspects and features are disclosed in the appendix attached hereto and incorporated herein by reference.

In addition to the aforementioned aspects and features of the present invention, it should be noted that the present invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the present invention now will be described in detail with reference to the accompanying drawings, wherein the same elements are referred to with the same reference numerals.

DETAILED DESCRIPTION

Figure 1:
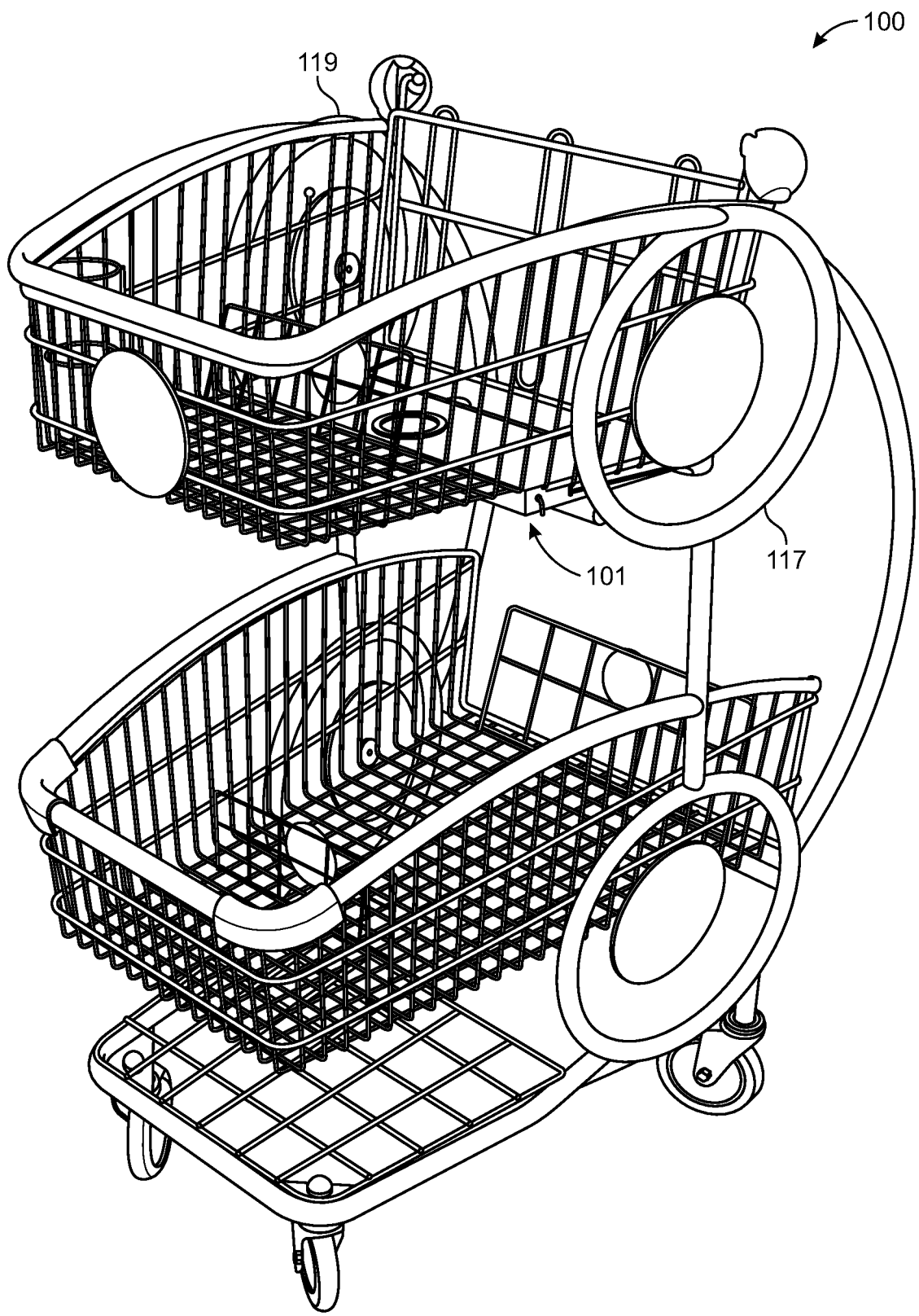
FIG. 1 is a left, front perspective view of a prototype of a preferred shopping cart that embodies one or more aspects and features of the invention, wherein a child seat of the shopping cart is in a retracted position, and wherein a gate of the child seat is in a retracted position.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element.

With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple"

has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

"Seatbelt" as used herein is intended to be interchangeable with "seat belt", "safety belt" and "restraint belt", which also may be used herein or in the incorporated disclosures of the patents. Similarly, "seatback" is intended to be interchangeable with "seat back".

Referring now to the drawings, one or more preferred embodiments of the invention are next described. The following description of one or more preferred embodiments is merely exemplary in nature and is in no way intended to limit the invention, its implementations, or uses.

Additionally, it will be appreciated that one or more preferred carts is similar to the carts of the incorporated design and utility patents. As such, reference is made to such incorporated material to the extent that preferred carts of the present invention have the same or common structure, design, aspects, or features of the carts of the incorporated design and utility patents, and primary differences thereover are the focus of the detailed description explicitly set forth herein, as follows.

Turning now to FIGS. 1-5, a prototype of a currently preferred shopping cart 100 that embodies one or more aspects and features of the invention is seen. This prototype represents not only the proof-of-concept but also the actual reduction to practice of many of the aspects and features of the present invention.

Figure 2:
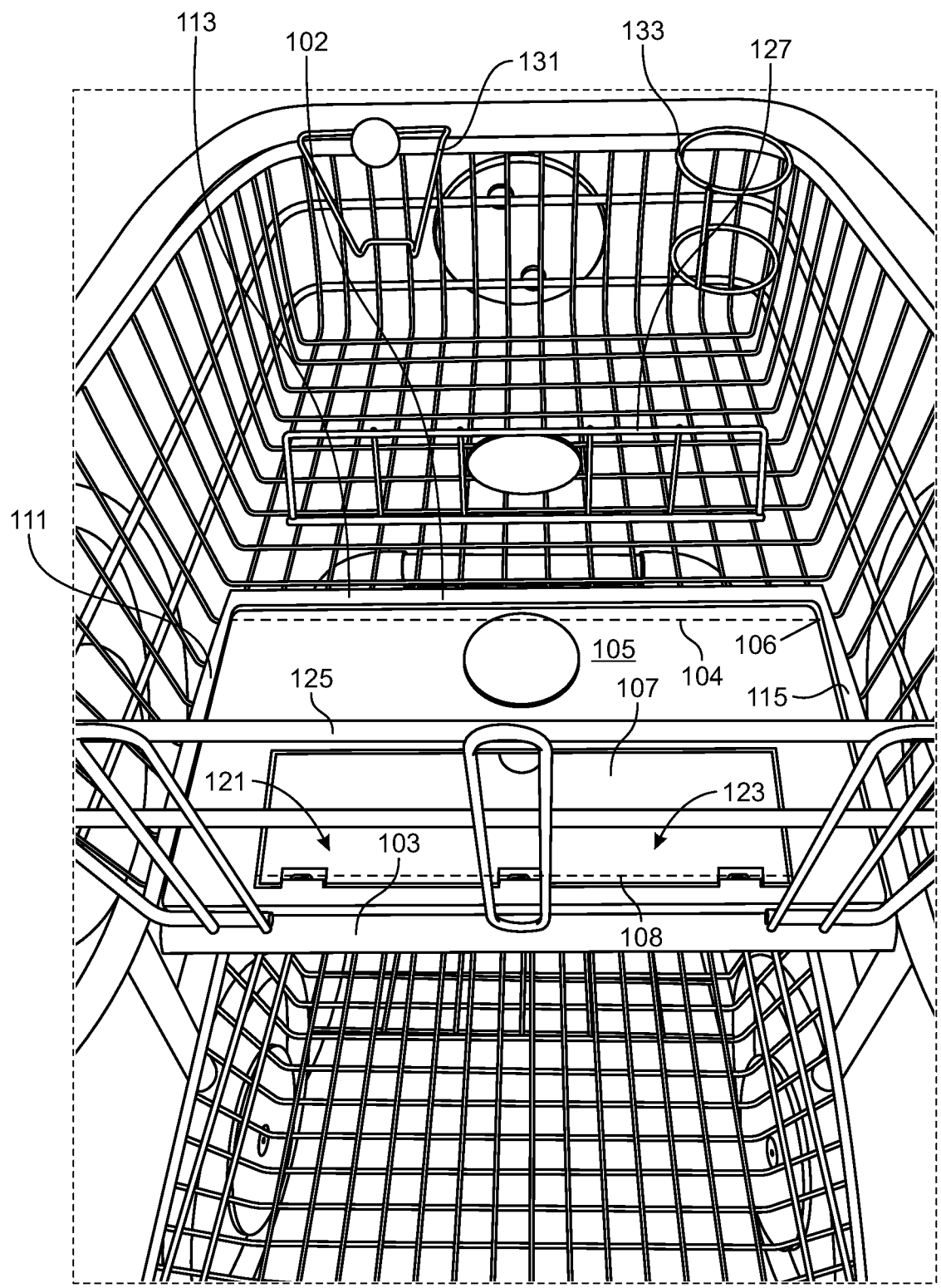
FIG. 2 is a rear perspective view of part of the shopping cart of FIG. 1, wherein a seatback of the child seat is in the retracted position, and wherein the gate of the seatback is in the retracted position.
Figure 3:
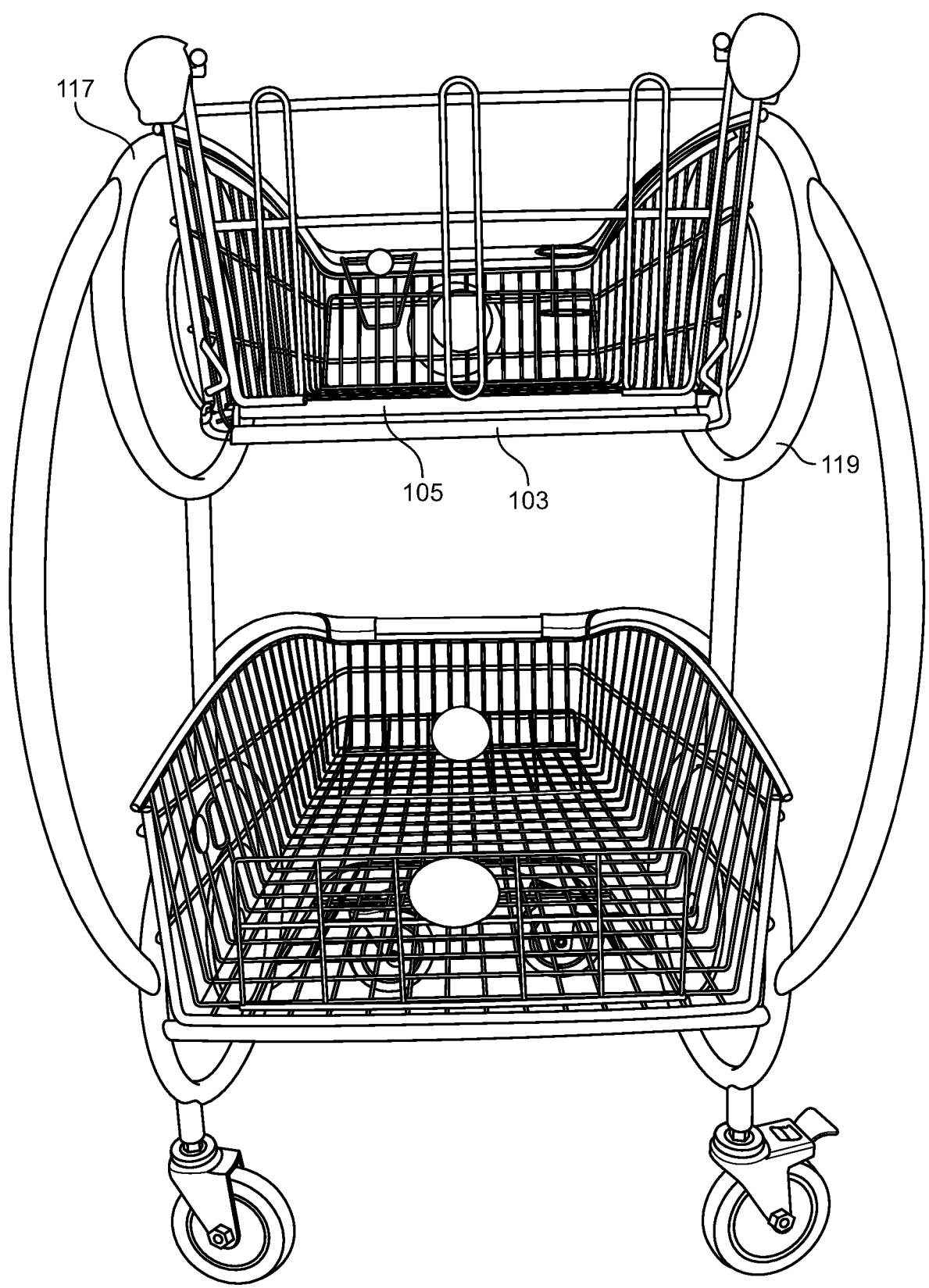
FIG. 3 is a rear elevational view of the shopping cart of FIG. 1, wherein the seatback is in the retracted position, and wherein the gate is in the retracted position.
Figure 4:
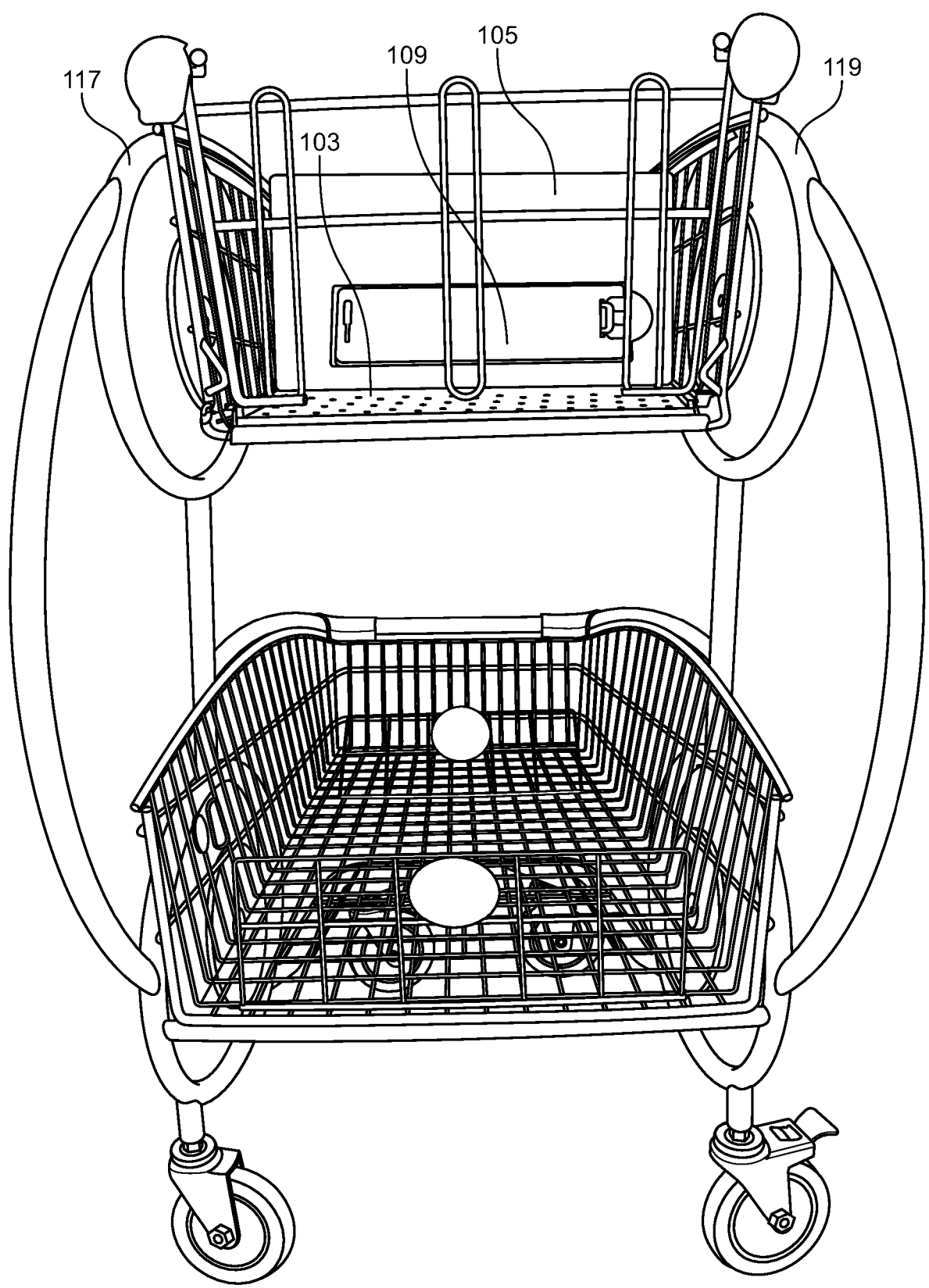
FIG. 4 is another rear elevational view of the shopping cart of FIG. 1, wherein the seatback is in an extended position.
Figure 5:
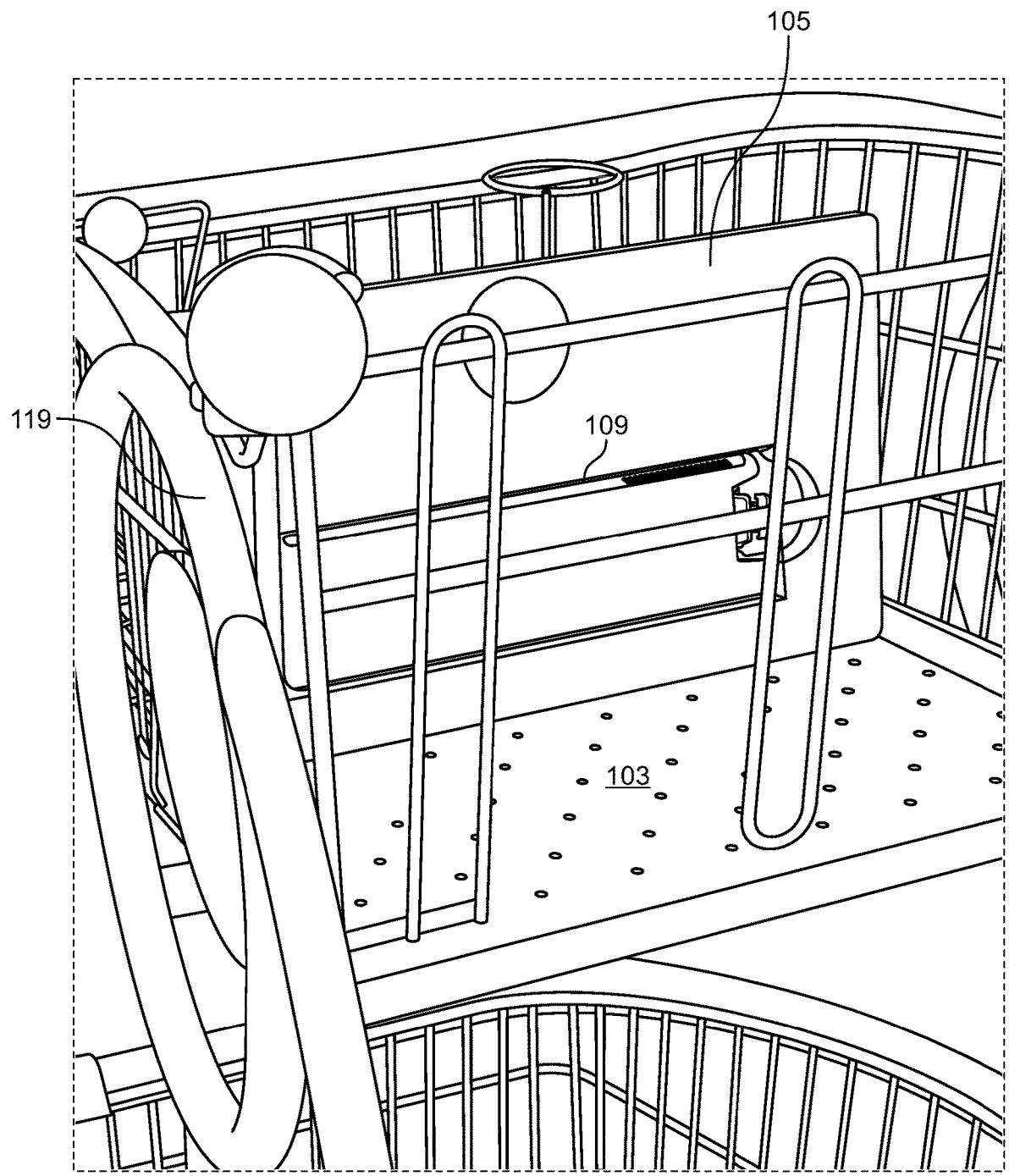
FIG. 5 is a left, rear perspective view of part of the shopping cart as seen in FIG. 4.

In particular, FIG. 1 is a left, front perspective view of the shopping cart 100; FIG. 2 is a rear perspective view of part of the shopping cart 100; FIG. 3 is a rear elevational view of the shopping cart 100; FIG. 4 is another rear elevational view of the shopping cart 100; and, FIG. 5 is a left, rear perspective view of part of the shopping cart 100 as it is seen in FIG. 4.

The shopping cart 100 has a child seat 101 in accordance with one or more aspects and features of the invention. The child seat 101 comprises a base 103, a seatback 105, and a gate 107. The seatback 105 rotates around an axis 104 of a hinge 106 (seen partially in FIG. 2) relative to the base 103 between a retracted position and an extended position.

Similarly, the gate 107 rotates around another axis 108 of a hinge relative to the base 103 between a retracted position and an extended position. In each of FIGS. 1-3, the seatback 105 of the child seat 101 is seen in the retracted position, and the gate 103 is seen in the retracted position. In contrast, FIG. 4 shows the seatback 105 in the extended position (with the gate 103 in the retracted position; not shown).

The base 103 includes flanged sides or rims 111, 113, 115. The bottom of the upper basket further defines an opening within which the child seat 101 is received, with rims 111, 113, 115 overlapping edges of the opening for retention of the child seat 101 within the opening.

Additionally, the child seat 101 preferably is located adjacent and supported by the widthwise elongate member that extends the width of the upper basket between upper handles 117, 119 and that supports the upper basket.

When the seatback 105 and the gate 107 both are in their respective retracted position, the top of the child seat 101 is generally flush with a bottom of the upper basket. This is perhaps best seen in the rear elevational view of FIG. 3.

It is believed that folding flush the retracted seatback when not in use enables greater utilization of available space in the upper cart. Additionally, the surface of the seatback against which a child rests, when retracted, preferably covers the sitting surface of the child, thereby preventing germs and bacteria that may be transferred from the child to one of these surfaces of the sitting area (including that of the seatback and of the sitting area) from contaminating food that may be placed within the upper basket of the shopping cart when the child seat is not being used by a child.

In at least some preferred embodiments, the outer surface of the seatback 105 includes an anti-slip coating—or otherwise comprises an anti-slip surface—such that a mobile phone, grocery list, or other item placed thereon when the seatback 105 is in the retracted position is kept from sliding around during pushing of the cart 100.

When the seatback 105 is in the extended position, the seatback 105 preferably abuts wall 127, which acts as a stop to further rotating of the seatback 105 away from its retracted position. The wall 127 provides support to the seatback 105 when a child is seated and leans back against the seatback 105.

Turning now to FIGS. 4 and 5, the seatback 105 is seen in its extended position. It also is seen that the child seat 101 further comprises a seatbelt module 109. When the seatback 105 is in its extended position, the seatbelt module 109 is exposed for use in restraining a child. Furthermore, when properly seated and restrained, the legs of the child preferably extend through the leg openings 121, 123 (perhaps are best seen in FIG. 2). The leg openings 121, 123 are defined in a rear wall 125 of the upper basket.

The seatbelt module 109 that is revealed in FIGS. 4 and 5 is received within a recess defined in the seatback 105. The seatbelt module 109 may be similar to one or more restraint belt assemblies for children disclosed in U.S. Pat. No. 7,780,240, the disclosure of which pertaining to restraint belt assemblies for children being hereby incorporated herein by reference.

Figure 17:
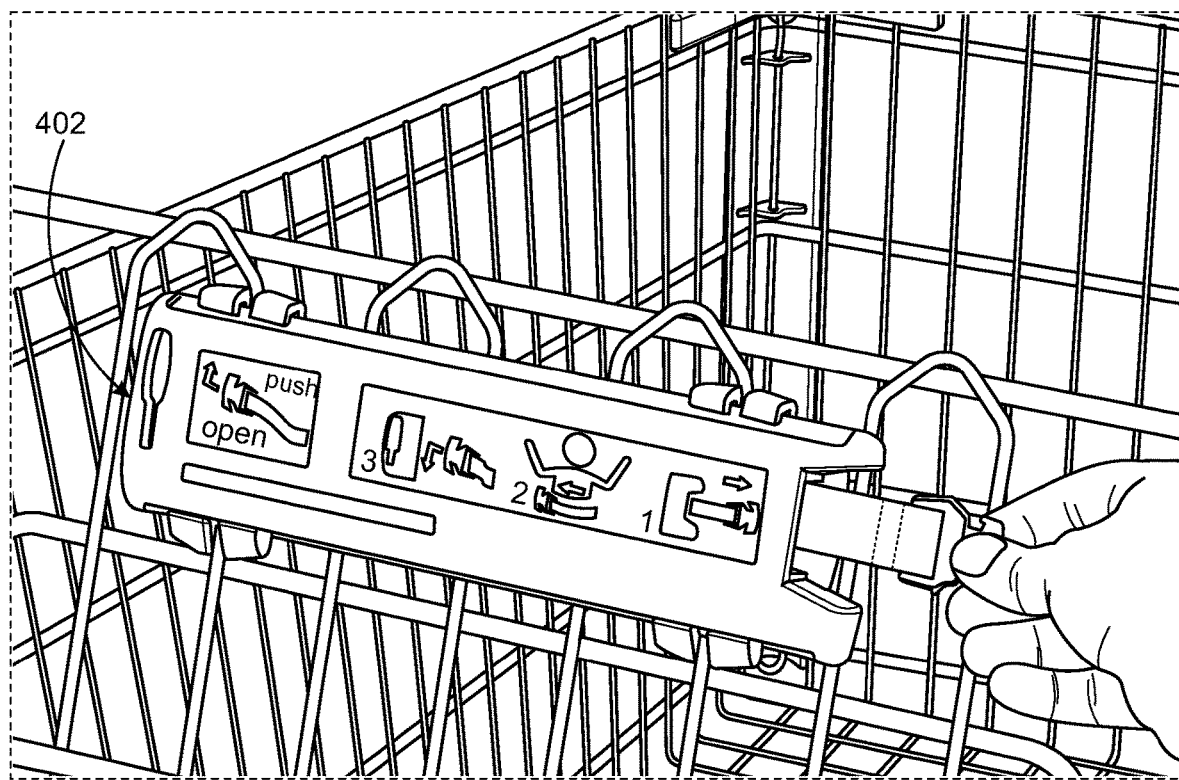
FIG. 17 is a perspective view of a conventional seatbelt module.
Figure 18:
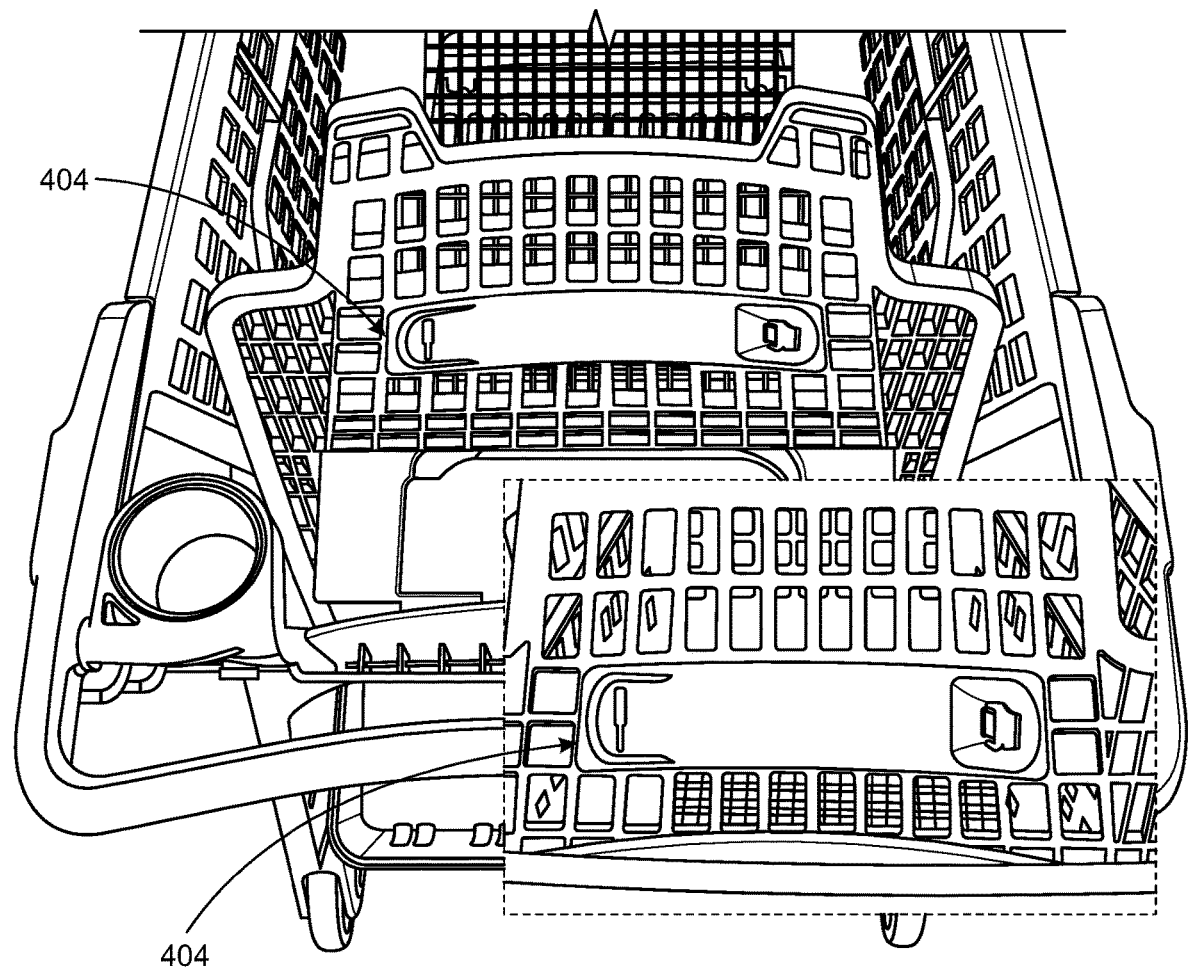
FIG. 18 is another perspective view of a conventional seatbelt module.

Another exemplary type of seatbelt module suitable for use is sold by POS-Technology Inc. of St. Charles, IL (a perspective view of such a seatbelt module 402 is seen in FIG. 17 of the drawings as well as in FIG. 17 of the appendix); and another exemplary type of seatbelt module suitable for use is sold by Bemis Manufacturing Company of Sheboygan Falls, Wisconsin (a perspective view of such a seatbelt module 404 is seen in FIG. 18 of the drawings as well as in FIG. 18 of the appendix). Of course, modification of each of these would be necessary for receipt within the recess of the seatback 105 such that the seatback 105 is flush when in the retracted position. Such modification of each of these conventional seatbelt modules 402, 404 as necessary to accomplish this is believed to be within the skill of the Ordinary Artisan.

Returning to FIG. 2, it should be noted that the shopping cart 100 includes a holder 131 for a mobile phone, seen in the front left corner of the upper basket, and a "cup" holder 133 for a beverage container, seen in the front right corner of the upper basket.

Figure 6:
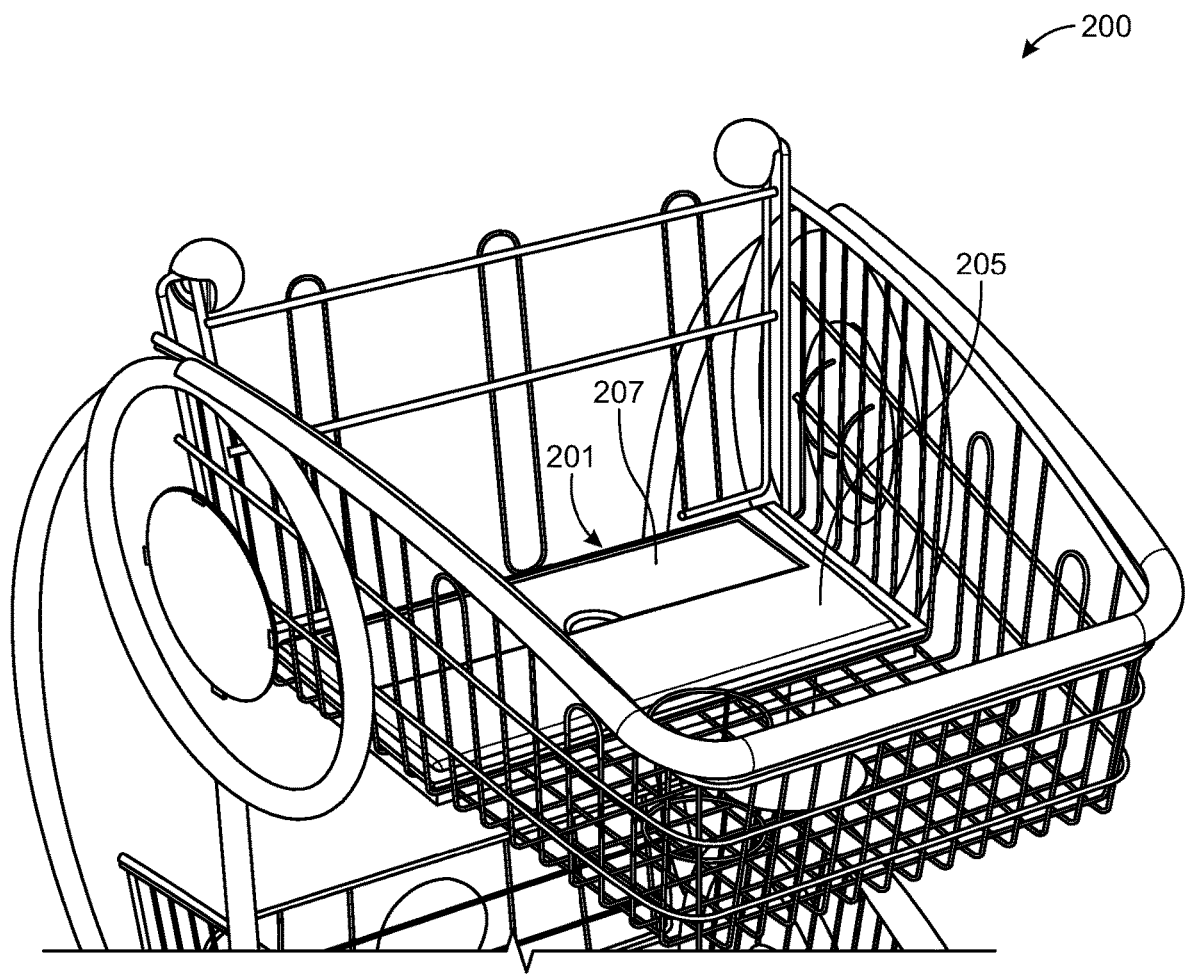
FIG. 6 is a right, front perspective view of a top part of a preferred shopping cart that embodies one or more aspects and features of the invention, wherein a seatback of the child seat of the shopping cart is in a retracted position, and wherein a gate of the seatback is in a retracted position.
Figure 7:
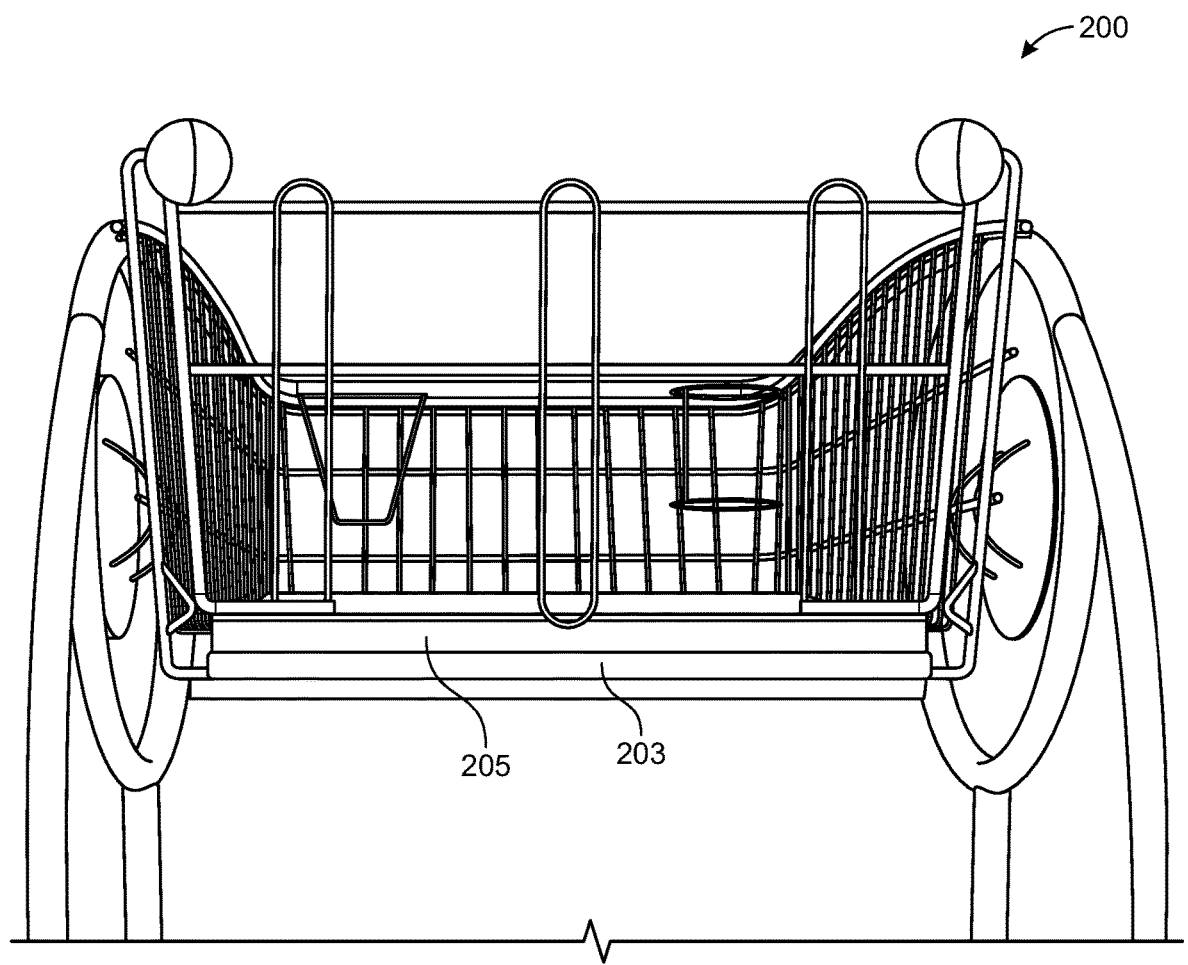
FIG. 7 is a rear elevational view of the top part of the shopping cart of FIG. 6, wherein the seatback of the child seat is in the retracted position, and wherein the gate of the seatback is in the retracted position.
Figure 8:
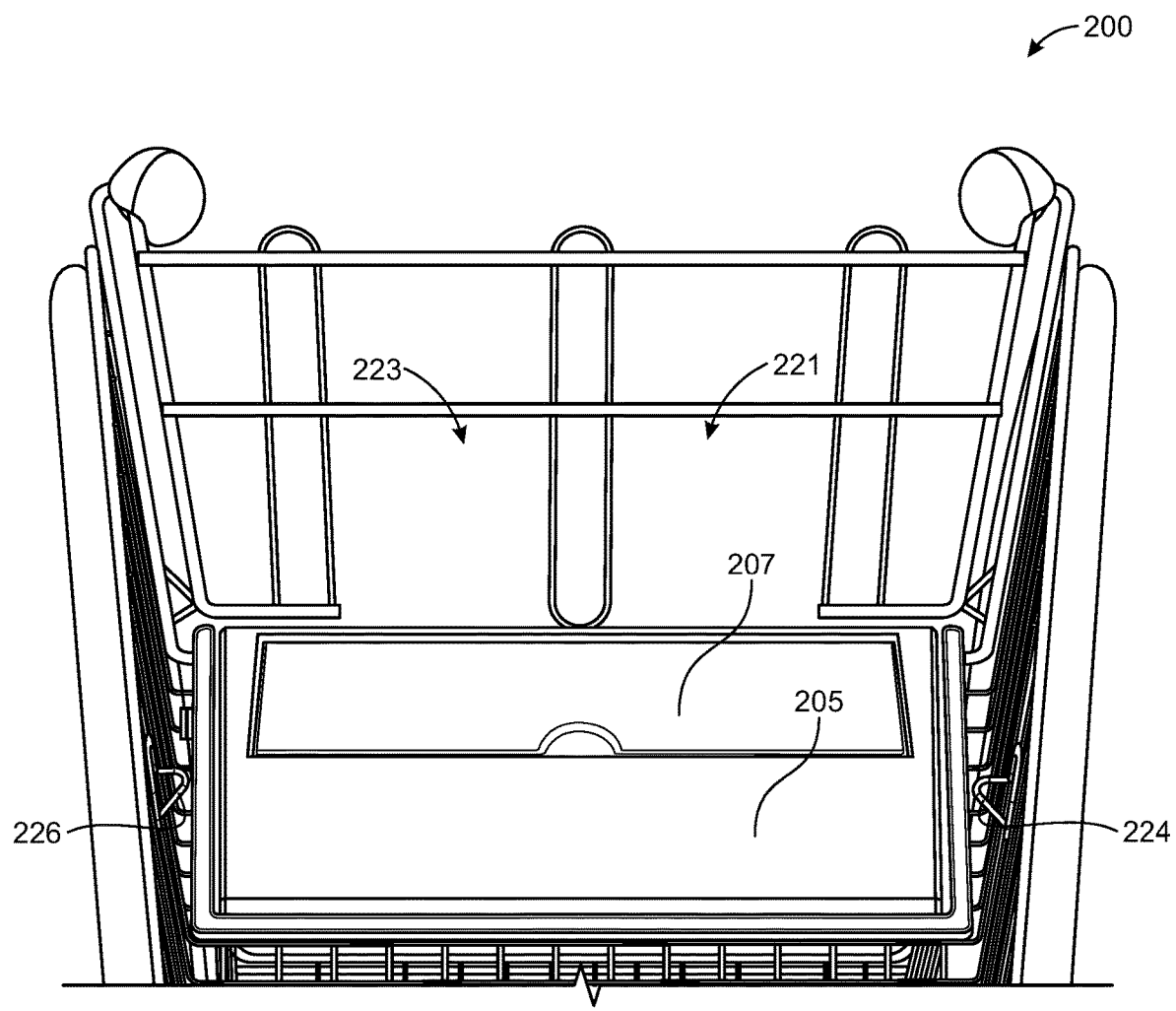
FIG. 8 is a top perspective view of part of the shopping cart of FIG. 6, wherein the seatback of the child seat is in the retracted position and the gate of the seatback is in the retracted position.
Figure 9:
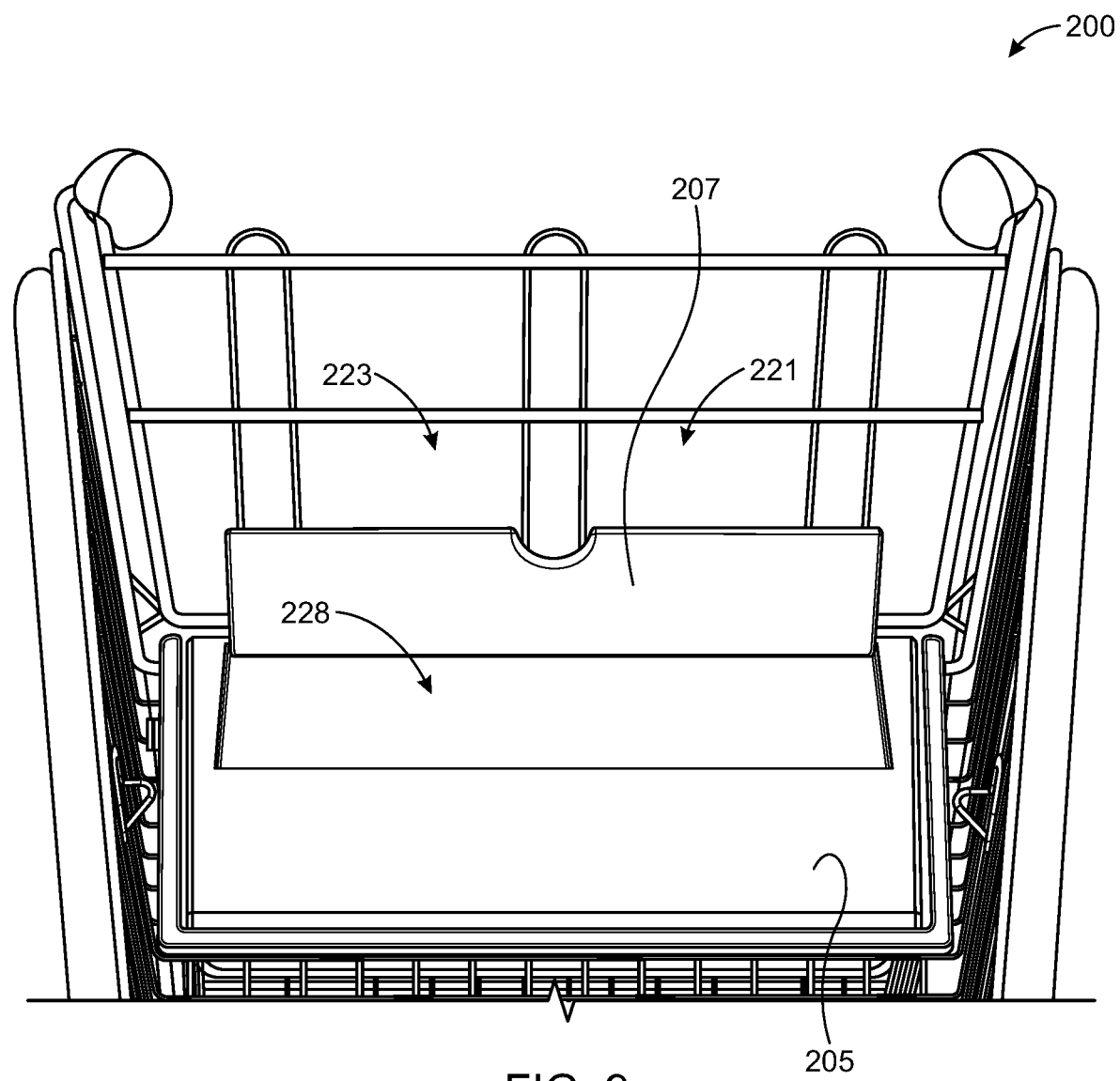
FIG. 9 is the perspective view of part of the shopping cart seen in FIG. 8, but wherein the seatback of the child seat is in the retracted position and the gate of the seatback is in an extended position.

FIG. 6 is a right, front perspective view of a top part of a preferred shopping cart 200 that embodies one or more aspects and features of the invention, wherein a seatback 205 of a child seat 201 of the shopping cart 200 is seen in a retracted position, and wherein a gate 207 of the seatback 205 is seen in a retracted position. FIG. 7—which is a rear elevational view—and FIG. 8—which is a top perspective view—also show the top part of the shopping cart 200, wherein the seatback 205 of the child seat 201 is in the retracted position and the gate 207 of the seatback 205 is in the retracted position. For contrast, FIG. 9 is the same perspective view of that of FIG. 8 but shows the gate 207 of the seatback 205 in an extended position, in which position the gate 207 partially blocks the leg openings 221, 223 in the rear wall of the upper basket and serves to keep items placed in the upper basket from falling through these openings when the child seat 201 is not used for a child. FIG. 9 also shows a recess 228 in which the gate 207 is received when in the retracted position. The gate 207 when in the retracted position preferably is flush with the surface of the seatback 205 in which surface the recess 228 is defined. It is believed that folding flush the seatback 205 when not in use enables greater utilization of available space in the upper cart.

Figure 10:
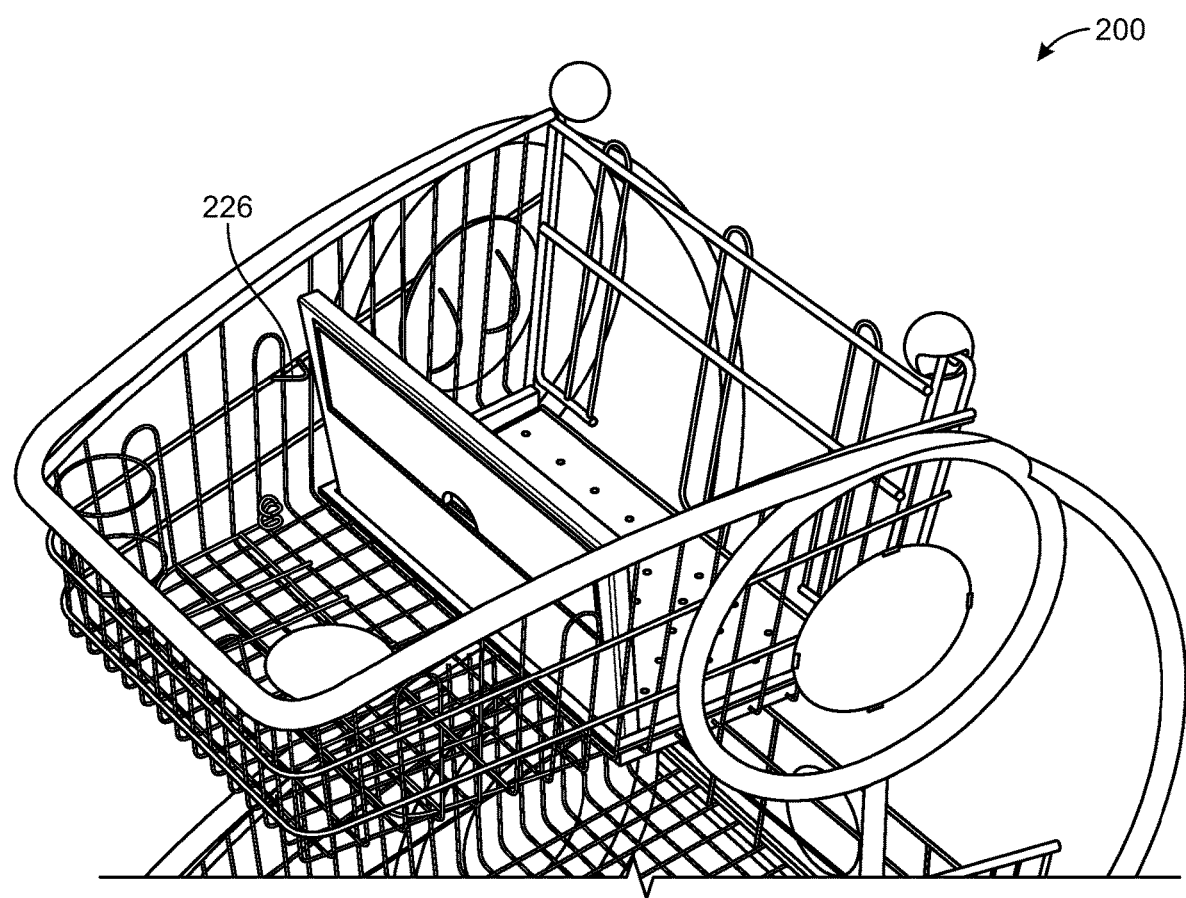
FIG. 10 is a left, front perspective view of the top part of the shopping cart of FIG. 6, wherein the seatback of the child seat is in the retracted position, and wherein the gate of the seatback is in the retracted position.
Figure 11:
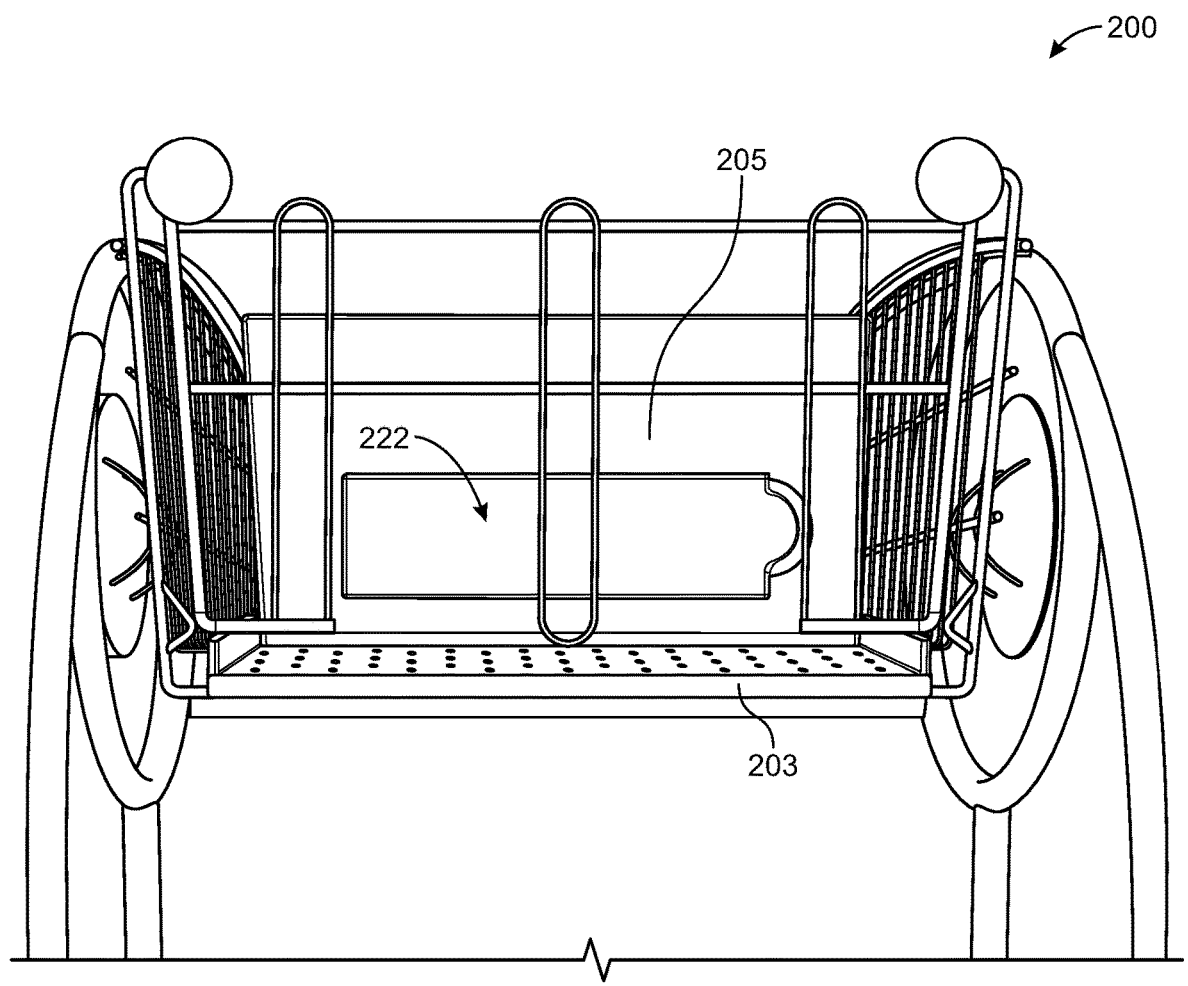
FIG. 11 is the elevational rear view of the top part of the shopping cart as seen in FIG. 7, but wherein the seatback of the child seat is in the extended position.
Figure 12:
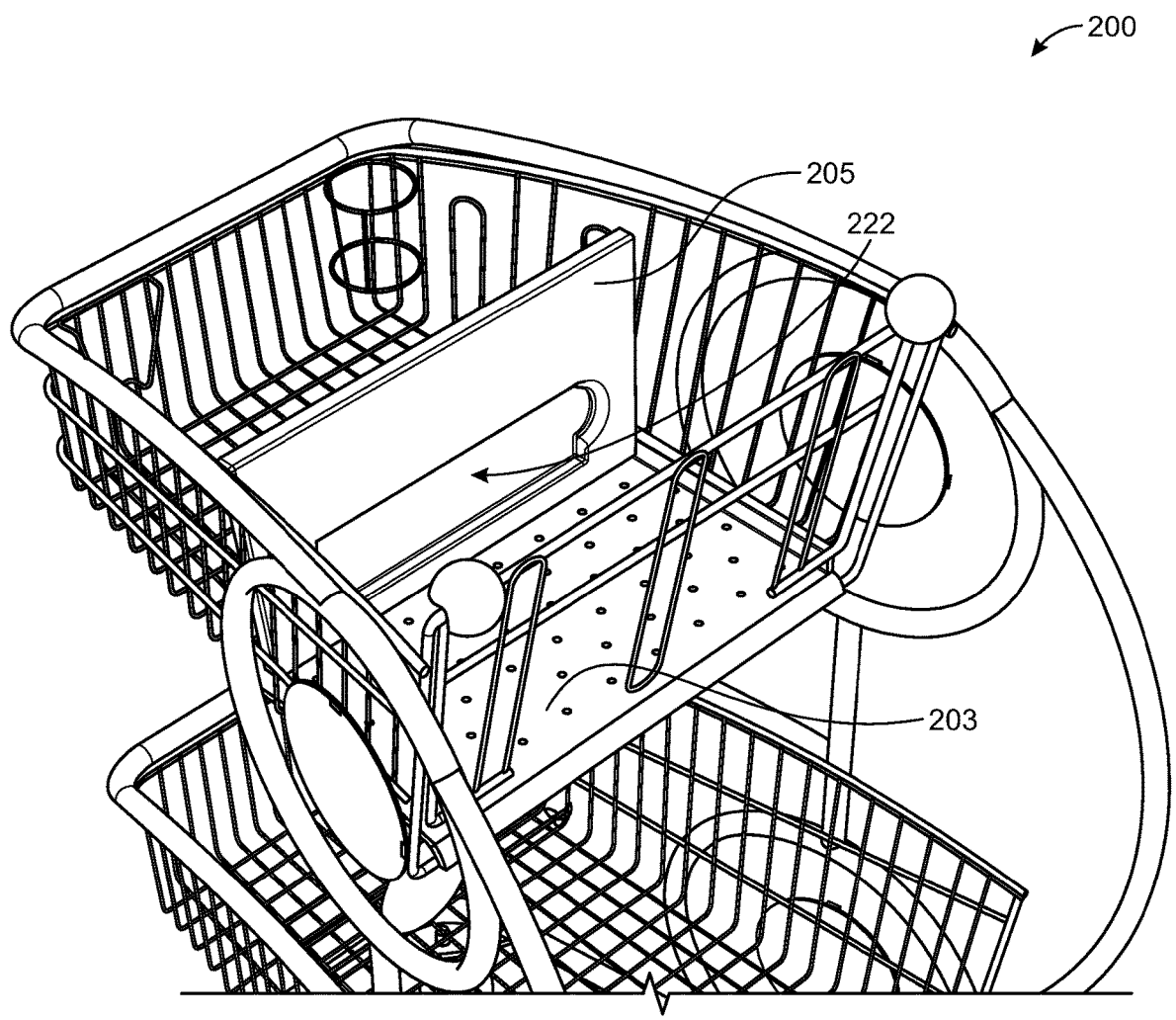
FIG. 12 is a left, rear perspective view of the top part of the shopping cart of FIG. 6, wherein the seatback of the child seat is in the extended position.
Figure 13:
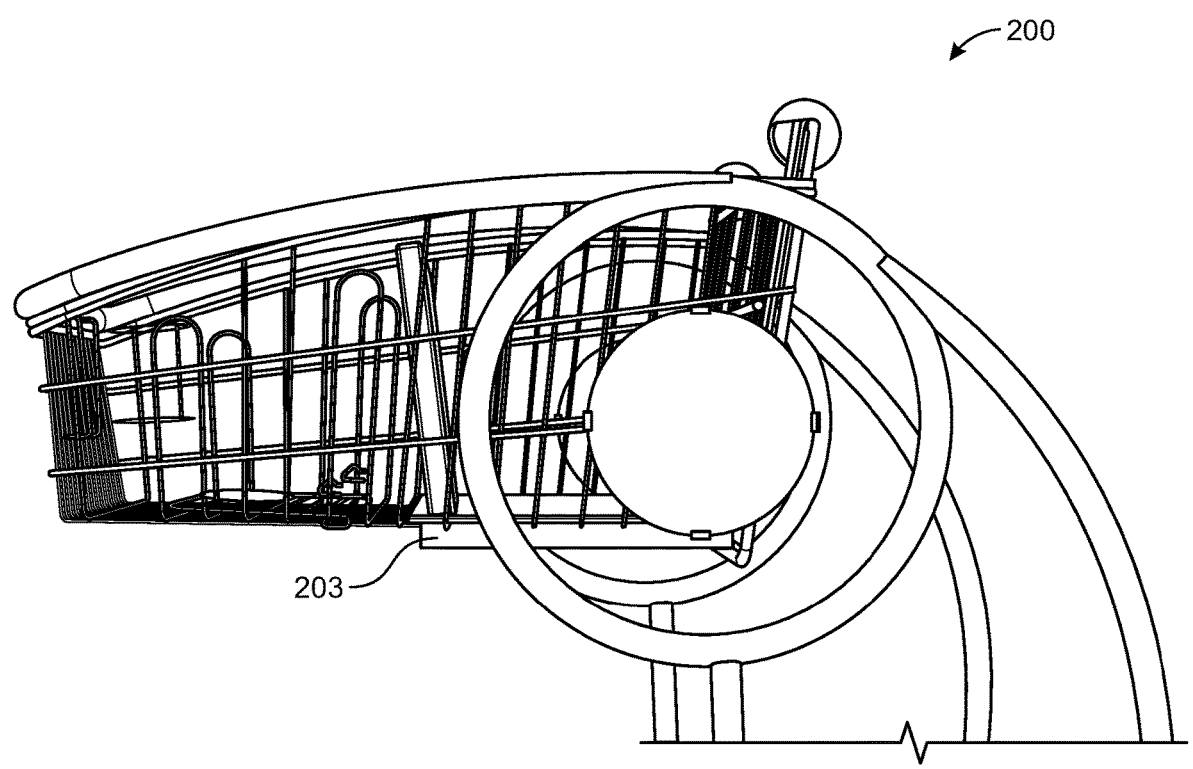
FIG. 13 is a left, elevational view of a side of the top part of the shopping cart of FIG. 6, wherein the seatback of the child seat is in the extended position, and wherein the gate is in the retracted position.

FIGS. 10-13 each shows the child seat 201 when the seatback 205 is in an extended position with the gate 207 in the retracted position. Specifically, FIG. 10 is a left, front perspective view of the top part of the shopping cart 200; FIG. 11 is a rear elevational view of the top part of the shopping cart 200; FIG. 12 is a left, rear perspective view of the top part of the shopping cart 200; and, FIG. 13 is a left, elevational view of a side of the top part of the shopping cart 200. As seen in at least one of these figures, stops 224, 226 extending inwardly from the side walls of the upper basket abut and support the seatback 205 when the seatback 205 is in the extended position. The stops 224, 226 preferably are formed from the wire segments that form the upper basket, and each may be in the form of a protruding loop, as seen, for example, in FIG. 10. The axis 204 about which the seatback 205 rotates is seen in the cross-sectional view of FIG. 16, as is the axis 208 about which the gate 207 rotates. Additionally, it will be appreciated that a seatbelt module is omitted from FIGS. 10-13 for clarity, but in use the seatbelt module is indeed present and received within the recess 222 of the seatback 205 of the child seat 201.

Figure 14:
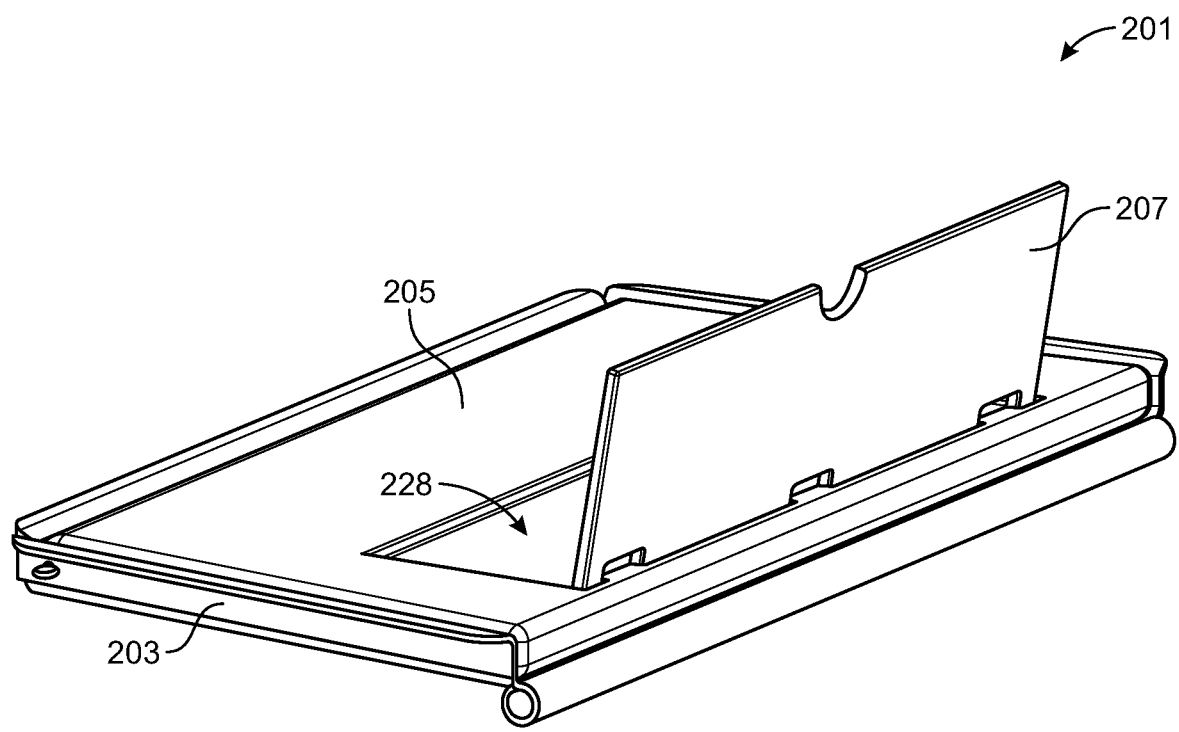
FIG. 14 is a left, rear perspective view of the child seat of the shopping cart of FIGS. 6-13, wherein the seatback of the child seat is in the retracted position, and wherein the gate of the seatback is in an extended position.
Figure 15:
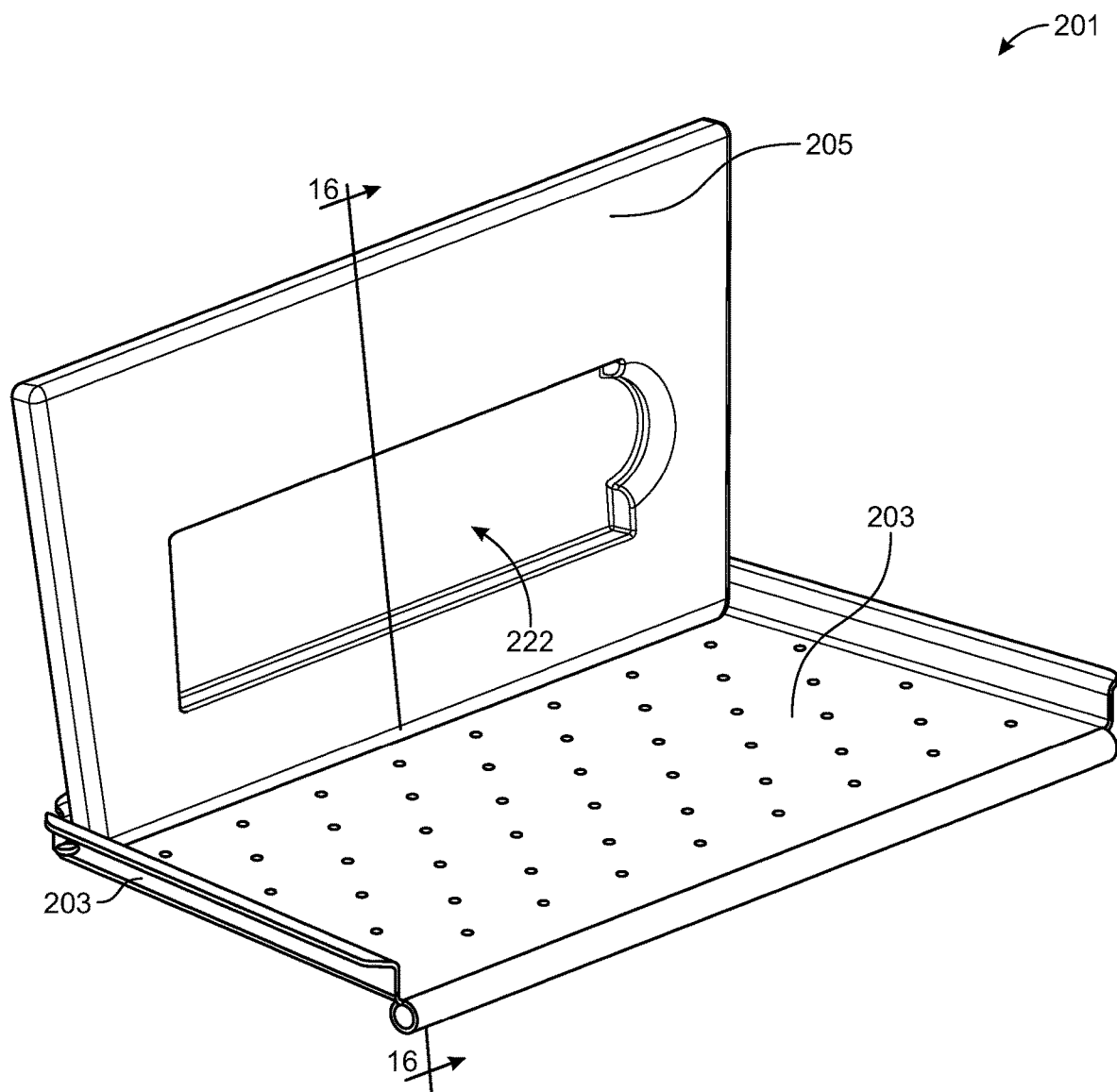
FIG. 15 is the perspective view of the child seat of FIG. 14, wherein the seatback of the child seat is in the extended position.
Figure 16:
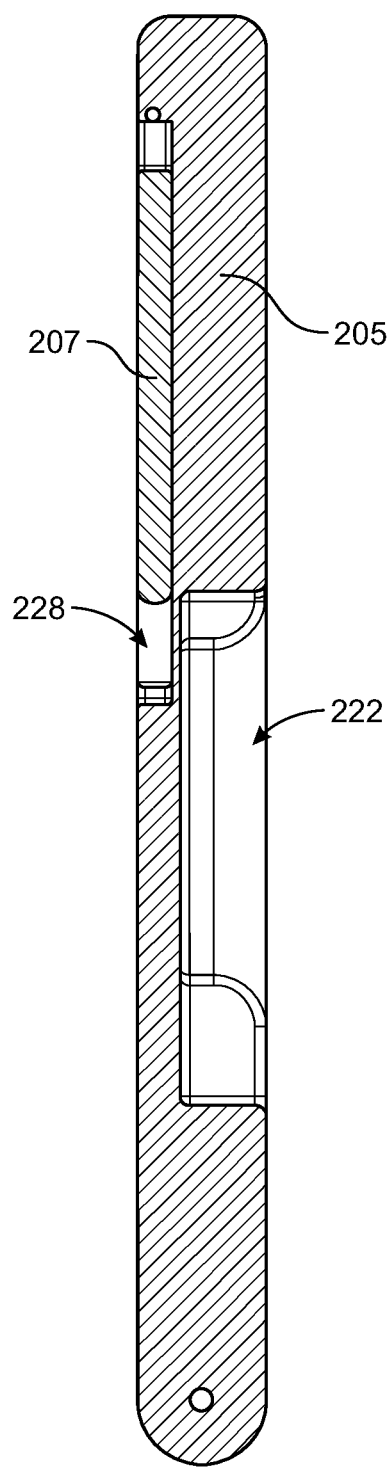
FIG. 16 is a cross-sectional view of the seatback and gate of the child seat of FIG. 15 taken along the line 16-16, wherein the seatback is in the extended position and the gate is in the retracted position.

With particular focus on the child seat 201, FIG. 14 is a left, rear perspective view of the child seat 201 when the seatback 205 is in the retracted position and the gate 207 in the extended position; FIG. 15 is the perspective view of the child seat 201 of FIG. 14, but wherein the seatback 205 is in the extended position (with the gate in the retracted position; not shown in FIG. 14); and, FIG. 16 is a cross-sectional view of the seatback 205 that includes the gate 207, which view is taken along the line 16-16 of FIG. 15, wherein the seatback 205 is in the extended position and the gate 207 is in the retracted position.

Figure 19:
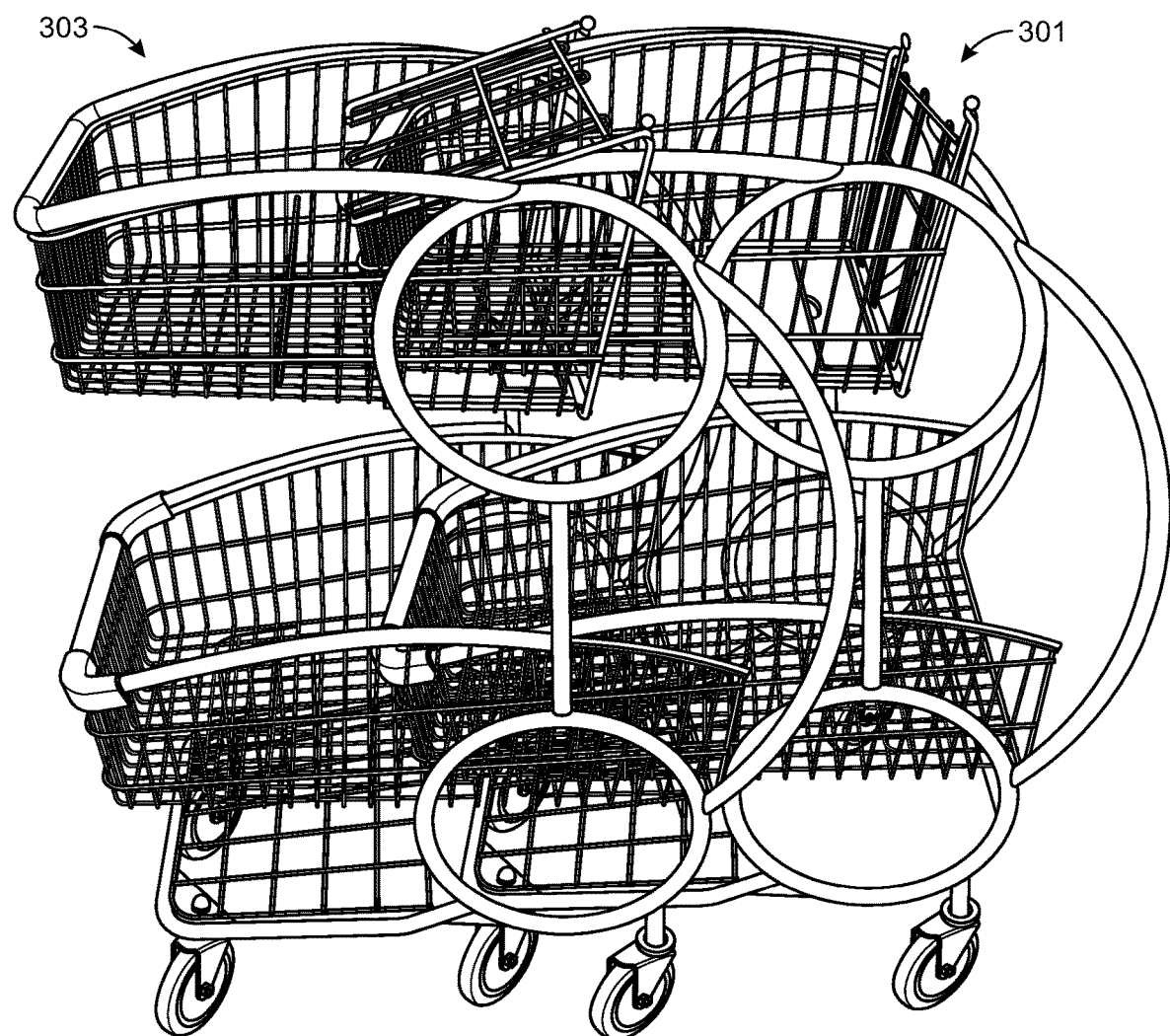
FIG. 19 is a left, side perspective view of the nesting together of two shopping carts each like the shopping cart of FIGS. 6-13.

FIG. 19 is a left, side perspective view of the nesting together of two shopping carts 301, 303, each of which is like the shopping cart 200 of FIGS. 6-13. Preferably, these shopping carts 301, 303 are able to nest even when the seatback of cart 303 is in the extended position. Furthermore, the configuration and dimensions of the dual-basket designs allows for the same nesting distance whether the seatback of the child seat is extended or retracted. In other words, the seatback 105 does not have to be folded, collapsed, or retracted in order to allow the carts to nest; the carts are nestable even when the seatback 105 is in the extended position for use by a child.

Specifically, when nesting the upper basket of the receiving cart 303 receives a front portion of the upper basket of the inserted cart 301, with the rear wall of the upper basket of the receiving cart swinging inwardly and upwardly to receive the front portion of the upper basket of the inserted cart 301. Additionally, the lower basket of the receiving cart 303 receives a front portion of the lower basket of the inserted cart 301, with the rear wall of the lower basket of the receiving cart rotating toward the floor of the lower basket for receiving the front portion of the lower basket of the inserted cart 301.

It is believed that use of shopping carts in accordance with one or more aspects and features of the present invention result in a child being held in a more upright and natural sitting position compared to at least some existing carts. Furthermore, it is believed that it is more difficult for a child to crawl out of the child seat of shopping carts in accordance with one or more aspects and features of the present invention, and that such shopping carts are more comfortable for a child to sit in when compared to at least some existing carts.

Based on the foregoing description, it will be readily understood by those persons skilled in the art that the present invention has broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Thus, for example, while a preferred cart in accordance with one or more aspects and features of the invention may comprise a lower basket, a cart in accordance with one or more aspects and features of the invention need not necessarily have a lower basket.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method of using a shopping cart that comprises a base and a seatback connected to the base and movable relative to the base between a retracted position, in which a sitting area of the child seat is covered by the seatback, and an extended position, in which the sitting area of the child seat is exposed for sitting and in which the seatback serves to support a back of a child when sitting in the sitting area, wherein the seatback comprises a recess located in a surface of the seatback that faces the sitting area when the seatback is in the retracted position, within which recess a seatbelt module is received, the seatbelt module comprising a seatbelt for restraint of a child when seated in the sitting area, and wherein the seat further comprises a gate connected to the seatback and movable relative to the seatback between a retracted position, in which the gate is flush with a surface of the seatback, and an extended position, in which the gate extends in a generally upright manner from the surface of the seatback, the method comprising, when using the cart to seat a child, moving the gate to its retracted position, moving the seatback to its extended position, placing a child in the sitting area such that legs of the child extend through leg openings in the cart and a back of the child rests against the seatback in its extended position, and restraining the child with the seatbelt.

2. The method of claim 1, wherein the seatback is flush with a top of the base when in the retracted position.

3. The method of claim 1, wherein the seatback rotates between the retracted position and the extended position.

4. The method of claim 1, wherein the base defines the sitting area, and wherein the seatback is received within the sitting area and covers a floor of the sitting area when in the retracted position.

5. The method of claim 1, wherein the gate is received within the seatback when in the retracted position.

6. The method of claim 1, wherein the surface of the seatback with which the gate is flush when the gate is in the retracted position is an outwardly facing surface of the seatback when the seatback is in the retracted position.

7. The method of claim 1, wherein the gate rotates between the retracted position and the extended position, the gate being received within a recessed area defined by the seatback when the gate is in the retracted position.

8. The method of claim 1, wherein the seatback rotates about a first axis in moving between the retracted position of the seatback and the extended position of the seatback; wherein the gate rotates about a second axis in moving between the retracted position of the gate and the extended position of the gate; wherein the first axis and the second axis are parallel and are located on opposite widthwise sides of the seatback; and wherein the seatback and the gate rotate in opposite rotational directions when moving from their respective retracted positions to their respective extended positions.

9. A method of using a shopping cart that comprises a base and a seatback connected to the base and movable relative to the base between a retracted position, in which a sitting area of the child seat is covered by the seatback, and an extended position, in which the sitting area of the child seat is exposed for sitting and in which the seatback serves to support a back of a child when sitting in the sitting area, wherein the seatback comprises a recess located in a surface of the seatback that faces the sitting area when the seatback is in the retracted position, within which recess a seatbelt module is received, the seatbelt module comprising a seatbelt for restraint of a child when seated in the sitting area, and wherein the seat further comprises a gate connected to the seatback and movable relative to the seatback between a retracted position, in which the gate is flush with a surface of the seatback, and an extended position, in which the gate extends in a generally upright manner from the surface of the seatback, the method comprising, when using the cart to contain items and not seat a child, moving the seatback to its retracted position and moving the gate to its extended position to inhibit items contained in the cart from falling through the leg openings in the cart.

10. The method of claim 9, wherein the seatback is flush with a top of the base when in the retracted position.

11. The method of claim 9, wherein the seatback rotates between the retracted position and the extended position.

12. The method of claim 9, wherein the base defines the sitting area, and wherein the seatback is received within the sitting area and covers a floor of the sitting area when in the retracted position.

13. The method of claim 9, wherein the gate is received within the seatback when in the retracted position.

14. The method of claim 9, wherein the surface of the seatback with which the gate is flush when the gate is in the retracted position is an outwardly facing surface of the seatback when the seatback is in the retracted position.

15. The method of claim 9, wherein the gate rotates between the retracted position and the extended position, the gate being received within a recessed area defined by the seatback when the gate is in the retracted position.

16. The method of claim 9, wherein the seatback rotates about a first axis in moving between the retracted position of the seatback and the extended position of the seatback; wherein the gate rotates about a second axis in moving between the retracted position of the gate and the extended position of the gate; wherein the first axis and the second axis are parallel and are located on opposite widthwise sides of the seatback; and wherein the seatback and the gate rotate in opposite rotational directions when moving from their respective retracted positions to their respective extended positions.

17. A method of using a shopping cart that comprises a base and a seatback connected to the base and movable relative to the base between a retracted position, in which a sitting area of the child seat is covered by the seatback, and an extended position, in which the sitting area of the child seat is exposed for sitting and in which the seatback serves to support a back of a child when sitting in the sitting area, wherein the seatback comprises a recess located in a surface of the seatback that faces the sitting area when the seatback is in the retracted position, within which recess a seatbelt module is received, the seatbelt module comprising a seatbelt for restraint of a child when seated in the sitting area, and wherein the seat further comprises a gate connected to the seatback and movable relative to the seatback between a retracted position, in which the gate is flush with a surface of the seatback, and an extended position, in which the gate extends in a generally upright manner from the surface of the seatback, the method comprising, when using the cart to seat a child, moving the gate to its retracted position, moving the seatback to its extended position, placing a child in the sitting area such that legs of the child extend through leg openings in the cart and a back of the child rests against the seatback in its extended position, and restraining the child with the seatbelt; and when using the cart to contain items and not seat a child, moving the seatback to its retracted position and moving the gate to its extended position to inhibit items contained in the cart from falling through the leg openings in the cart.

18. The method of claim 17, wherein the gate is received within the seatback when in the retracted position.

19. The method of claim 17, wherein the surface of the seatback with which the gate is flush when the gate is in the retracted position is an outwardly facing surface of the seatback when the seatback is in the retracted position.

20. The method of claim 17, wherein the gate rotates between the retracted position and the extended position, the gate being received within a recessed area defined by the seatback when the gate is in the retracted position.

* * * * *